United States Patent
Albero et al.

(10) Patent No.: US 12,462,110 B2
(45) Date of Patent: Nov. 4, 2025

(54) NATURAL LANGUAGE GENERATION SYSTEM FOR AUTOMATED TRANSLATION OF DIGITAL MULTIMEDIA

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US); Prashant Thakur, Gujarat (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 283 days.

(21) Appl. No.: 18/135,800

(22) Filed: Apr. 18, 2023

(65) Prior Publication Data

US 2024/0355317 A1     Oct. 24, 2024

(51) Int. Cl.
*G06F 40/40* (2020.01)
*G10L 13/08* (2013.01)
*H04N 21/43* (2011.01)
*H04N 21/439* (2011.01)

(52) U.S. Cl.
CPC .......... *G06F 40/40* (2020.01); *G10L 13/086* (2013.01); *H04N 21/4307* (2013.01); *H04N 21/4396* (2013.01)

(58) Field of Classification Search
None
See application file for complete search history.

(56) References Cited

U.S. PATENT DOCUMENTS

| | | | |
|---|---|---|---|
| 6,937,974 B1 * | 8/2005 | d'Agostini | G06F 40/44 704/277 |
| 7,643,985 B2 | 1/2010 | Horvitz | |
| 8,185,375 B1 * | 5/2012 | Kumar | G06F 40/44 704/7 |
| 8,655,645 B1 * | 2/2014 | Morrissey | G06F 40/58 704/8 |
| 9,164,987 B2 * | 10/2015 | Chen | G06F 40/58 |
| 9,830,318 B2 | 11/2017 | Waibel | |

(Continued)

FOREIGN PATENT DOCUMENTS

WO     2008045815 A3     12/2008

*Primary Examiner* — Douglas Godbold
(74) *Attorney, Agent, or Firm* — Moore & Van Allen PLLC; Anup Iyer (57) ABSTRACT

Systems, computer program products, and methods are described herein for automated translation of digital multimedia. The present disclosure is configured to receive, from a user input device, a search request; determine the response for the search query in a first natural language, wherein the response comprises digital multimedia; reconfigure the response for display on the user input device in the preferred natural language, wherein reconfiguring further comprises: determining an intermediate natural language based on a lexical similarity with the preferred natural language; translating, using a first natural language translation subsystem, the response from the first natural language to the intermediate language; and translating, using a second natural language translation subsystem, the response from the intermediate language to the preferred natural language; and display the reconfigured response on the user input device in the preferred natural language.

20 Claims, 5 Drawing Sheets

(56) References Cited

U.S. PATENT DOCUMENTS

| | | | |
|---|---|---|---|
| 10,380,992 B2 | 8/2019 | Talwar | |
| 10,496,759 B2 | 12/2019 | Cuthbert | |
| 10,984,784 B2* | 4/2021 | Kuczmarski | G06F 16/3329 |
| 11,100,296 B2 | 8/2021 | Jeon | |
| 11,250,841 B2 | 2/2022 | Roux | |
| 11,600,263 B1 | 3/2023 | Blair | |
| 11,636,131 B1* | 4/2023 | Mishra | H04N 21/4856 |
| | | | 707/722 |
| 11,734,514 B1 | 8/2023 | Shorter | |
| 11,749,265 B2 | 9/2023 | Doggett | |
| 11,947,872 B1 | 4/2024 | Mahler-Haug | |
| 2005/0010421 A1* | 1/2005 | Watanabe | G06F 40/169 |
| | | | 704/277 |
| 2009/0083023 A1 | 3/2009 | Foster | |
| 2011/0137926 A1* | 6/2011 | Chen | G06F 40/58 |
| | | | 707/E17.073 |
| 2012/0017146 A1* | 1/2012 | Travieso | G06F 40/58 |
| | | | 715/265 |
| 2013/0226553 A1* | 8/2013 | Ji | G06F 40/44 |
| | | | 704/2 |
| 2013/0253902 A1* | 9/2013 | Pilkin | G06F 40/45 |
| | | | 704/2 |
| 2017/0083510 A1* | 3/2017 | Dixon | G06F 40/44 |
| 2017/0147558 A1* | 5/2017 | Kim | G06F 40/58 |
| 2017/0337191 A1* | 11/2017 | Narayanan | G06F 40/58 |
| 2019/0325864 A1 | 10/2019 | Anders | |
| 2019/0332679 A1* | 10/2019 | Kristjansson | H04M 3/56 |
| 2021/0006660 A1 | 1/2021 | Adibi | |
| 2021/0375261 A1* | 12/2021 | Swvigaradoss | G06F 40/274 |
| 2022/0044668 A1* | 2/2022 | Kumar | H04N 21/4394 |
| 2022/0108164 A1 | 4/2022 | Coman | |
| 2022/0130378 A1 | 4/2022 | Avijeet | |
| 2023/0186026 A1 | 6/2023 | Arthur | |
| 2023/0316940 A1 | 10/2023 | Le Chevalier | |
| 2023/0335108 A1 | 10/2023 | Zoller | |
| 2024/0046048 A1* | 2/2024 | Packowski | G06F 40/51 |
| 2024/0105180 A1 | 3/2024 | Aggarwal | |
| 2024/0111967 A1* | 4/2024 | Wang | G06F 40/58 |
| 2024/0111969 A1 | 4/2024 | Glass | |
| 2024/0127008 A1 | 4/2024 | Pabolu | |

* cited by examiner

NATURAL LANGUAGE GENERATION SYSTEM FOR AUTOMATED TRANSLATION OF DIGITAL MULTIMEDIA

TECHNOLOGICAL FIELD

Example embodiments of the present disclosure relate to natural language generation system for automated translation of digital multimedia.

BACKGROUND

In an increasingly interconnected world, the need for seamless communication and understanding across different languages has become more critical than ever. There is a need for a multimodal natural language generation system for automated translation of digital multimedia.

Applicant has identified a number of deficiencies and problems associated with automated translation of digital multimedia. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for automated translation of digital multimedia.

In one aspect, a natural language generation system for automated translation of digital multimedia is presented. The system comprising: a processing device; a non-transitory storage device containing instructions when executed by the processing device, causes the processing device to perform the steps of: receive, from a user input device, a search request, wherein the search request comprises a search query and a preferred natural language for a response to the search query; determine the response for the search query in a first natural language, wherein the response comprises digital multimedia; reconfigure the response for display on the user input device in the preferred natural language, wherein reconfiguring further comprises: determining an intermediate natural language based on a lexical similarity with the preferred natural language; translating, using a first natural language translation subsystem, the response from the first natural language to the intermediate language; and translating, using a second natural language translation subsystem, the response from the intermediate language to the preferred natural language; and transmit the reconfigured response to be displayed on the user input device in the preferred natural language.

In some embodiments, executing the instructions further causes the processing device to: determine that the response for the search query is unavailable in the preferred natural language; and in response, determine the response for the search query in the first natural language.

In some embodiments, executing the instructions to reconfigure the response further causes the processing device to: determine that the response comprises audio and video media components; translate, using the first natural language translation subsystem, the audio media component from the first natural language to the intermediate natural language; and generate, using the first natural language translation subsystem, a transcript of the audio media component in the intermediate natural language.

In some embodiments, executing the instructions further causes the processing device to: translate, using the second natural language translation subsystem, the audio media component from the intermediate natural language to the preferred natural language; generate, using the second natural language translation subsystem, a transcript of the audio media component in the preferred natural language; and overlay the audio media component in the preferred natural language on the video media component, wherein overlay further comprises muting the audio media component in the first natural language.

In some embodiments, executing the instructions further causes the processing device to: transmit the transcript of the audio media component in the preferred natural language to be displayed on the user input device.

In some embodiments, executing the instructions further causes the processing device to: determine that a natural language translation subsystem to translate the response for the search query from the first natural language to the preferred natural language is unavailable; determine one or more intermediate natural languages based on their lexical similarity with the preferred natural language; and determine the intermediate natural language with lexical similarity that is greater than a predefined threshold.

In some embodiments, executing the instructions further causes the processing device to: determine one or more natural language translation subsystems associated with the one or more intermediate natural languages that are capable of translating the response for the search query from the one or more intermediate natural languages to the preferred natural language.

In another aspect, a computer program product for automated translation of digital multimedia is presented. The computer program product comprising a non-transitory computer-readable medium comprising code causing an apparatus to: receive, from a user input device, a search request, wherein the search request comprises a search query and a preferred natural language for a response to the search query; determine the response for the search query in a first natural language, wherein the response comprises digital multimedia; reconfigure the response for display on the user input device in the preferred natural language, wherein reconfiguring further comprises: determining an intermediate natural language based on a lexical similarity with the preferred natural language; translating, using a first natural language translation subsystem, the response from the first natural language to the intermediate language; and translating, using a second natural language translation subsystem, the response from the intermediate language to the preferred natural language; and transmit the reconfigured response to be displayed on the user input device in the preferred natural language.

In yet another aspect, a method for automated translation of digital multimedia is presented. The method comprising: receiving, from a user input device, a search request, wherein the search request comprises a search query and a preferred natural language for a response to the search query; determining the response for the search query in a first natural language, wherein the response comprises digital multimedia; reconfiguring the response for display on the user input device in the preferred natural language, wherein reconfiguring further comprises: determining an intermediate natural language based on a lexical similarity with the preferred natural language; translating, using a first natural language translation subsystem, the response from the first natural language to the intermediate language; and translating, using a second natural language translation subsystem, the response from the intermediate language to the preferred natural language; and transmitting the reconfigured response to be displayed on the user input device in the preferred natural language.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In an increasingly interconnected world, access to information and resources transcends linguistic barriers, making the ability to effectively translate and interpret content vital for seamless exchange and understanding. Conventional techniques that sift through vast amounts of data to deliver accurate results, are typically not equipped to accurately interpret relevant responses in a variety of languages, especially when the relevant responses include digital multimedia. Therefore, there is a need for a natural language processing system for automated translation of such digital media to parse and index diverse content, ensuring that users receive pertinent information irrespective of the language in which it was originally created. This not only fosters greater global collaboration and knowledge sharing, but also enhances the overall user experience by providing more comprehensive and relevant search results.

Accordingly, the present disclosure, (i) receives, from a user input device, a search request. The search request may include a search query and a preferred natural language for a response to the search query, (ii) determines the response for the search query in a first natural language. The search query may be translated into multiple languages to identify relevant responses and to expand the scope of relevant results for the user. Based on the relevant list of results obtained, the system may determine the response as the most relevant result from the list of results. The response may include digital multimedia (e.g., digital images, digital audio, digital video, interactive multimedia presentations, and other forms of digital content), (iii) reconfigures the response for display on the user input device in the preferred natural language. Converts the response from the first natural language (e.g., the language in which the response was initially retrieved) to the preferred natural language. Determines an intermediate natural language based on a lexical similarity (e.g., threshold based similarity) with the preferred natural language. Determines requisite natural language translation subsystems to translate the response from the first natural language to the intermediate natural language, and subsequently translate the response from the intermediate natural language to the preferred natural language. Translates, using a first natural language translation subsystem, the response from the first natural language to the intermediate language. Translates, using a second natural language translation subsystem, the response from the intermediate language to the preferred natural language. For example, Response 1/First Natural Language→Int. Natural Lang 1→Int. Natural Lang 2→Preferred Natural Language, and (iv) transmits the reconfigured response to be displayed on the user input device in the preferred natural language.

What is more, the embodiments of the present invention provide a technical solution to a technical problem and is an improvement over existing solutions. In particular, the embodiments of the present invention provide a more accurate solution to problem, thus reducing the number of resources required to remedy any errors made due to a less accurate solution. Further, the embodiments of the present invention remove manual input and waste from the implementation of the solution, thus improving speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

Figure 1A:
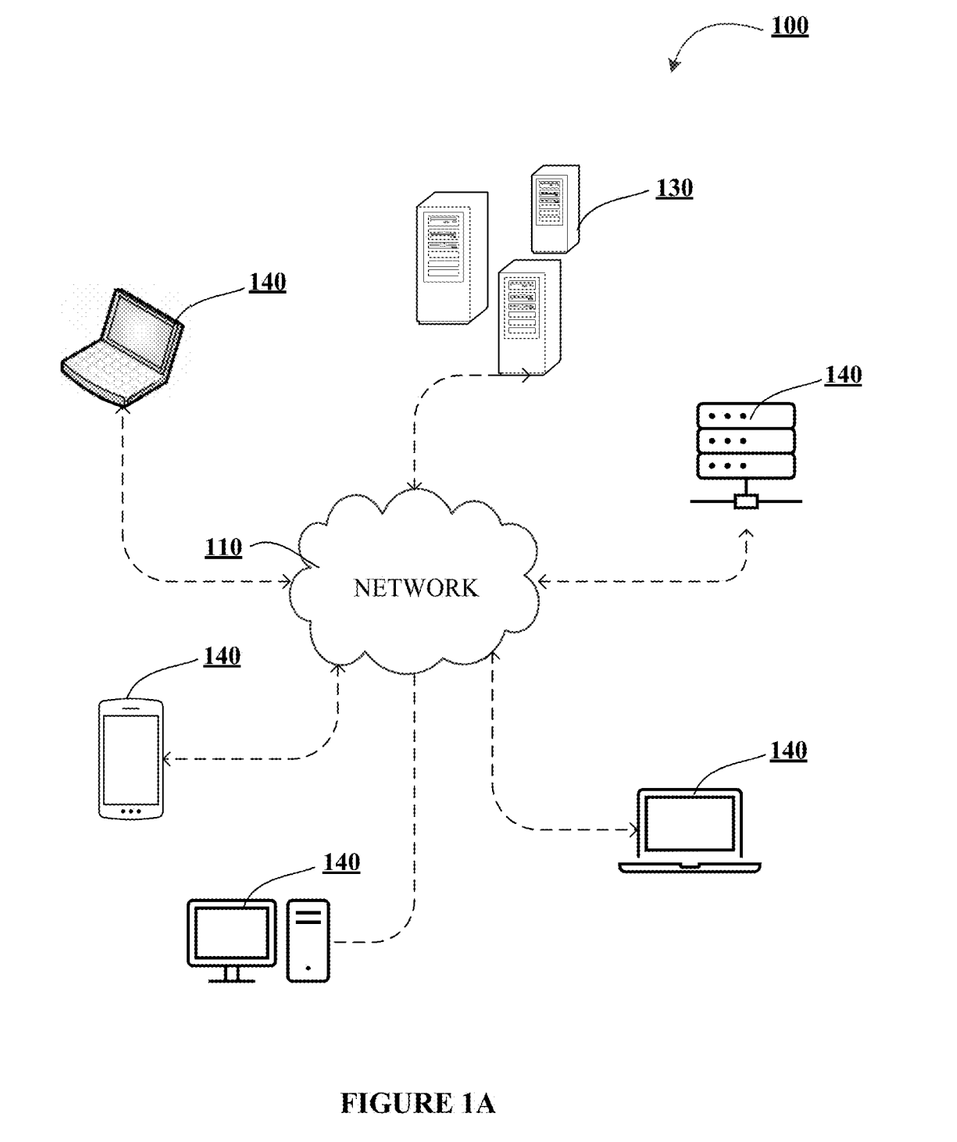
FIGS. 1A-1C illustrates technical components of an exemplary distributed computing environment for automated translation of digital multimedia, in accordance with an embodiment of the disclosure.
Figure 1B:
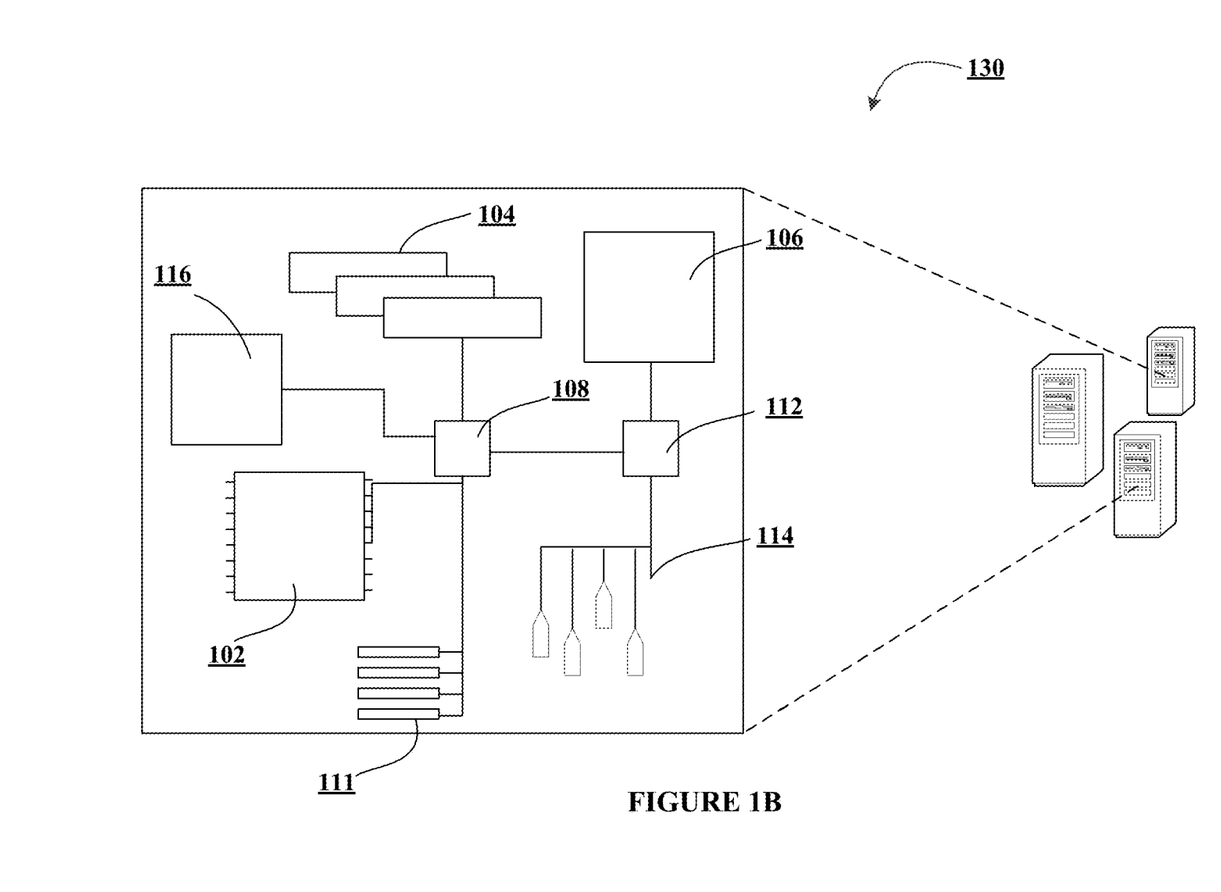
Figure 1C:
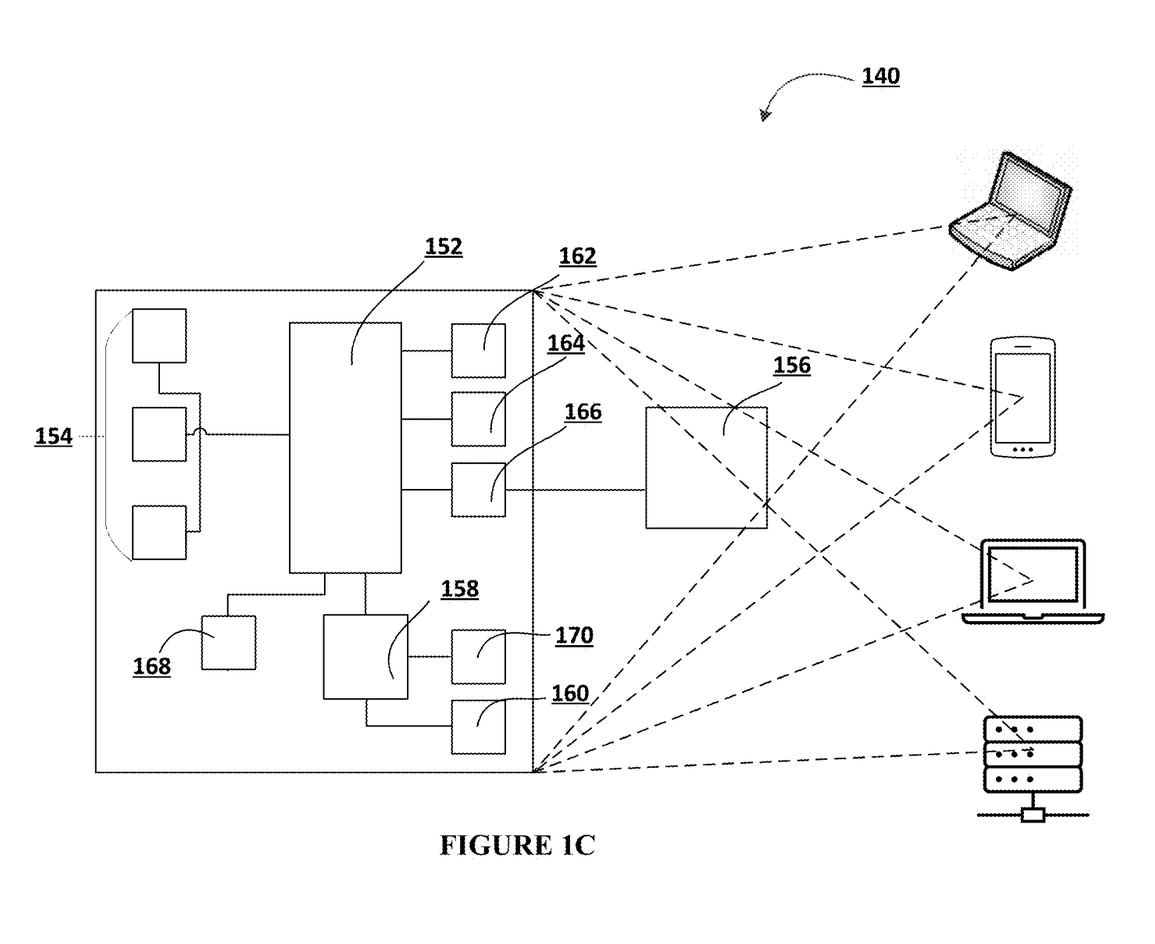

FIGS. 1A-1C illustrate technical components of an exemplary distributed computing environment for automated translation of digital multimedia 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein. In some embodiments, the processor 102 may include a number of subsystems to execute portions of processes and process flows described herein. Each subsystem may be a self-contained component of a larger system (e.g., system 130) and capable of being configured to execute specialized processes as part of the larger system, such as reconfiguring relevant responses to the search query to meet user specifications identified in the search request.

In example embodiments, the processor 102 may include a pre-processing subsystem, a natural language processing subsystem, a natural language translation subsystem, and a post-processing subsystem. In one example embodiment, the pre-processing subsystem may be configured to receive digital multimedia input and convert it into a format suitable for natural language processing. For example, the pre-processing subsystem may transcribe audio input into text using speech recognition algorithms or extract text from video content using optical character recognition. The natural language processing subsystem may be configured to process the input text and generate a syntactic and semantic representation of the content. To this end, the natural language processing subsystem may use techniques such as tokenization, part-of-speech tagging, parsing, and named entity recognition to analyze and understand the input text. In one example embodiment, the natural language translation subsystem may be configured to receive the syntactic and semantic representation from the natural language processing subsystem and translate it into a target language using machine learning algorithms. To this end, the natural language translation subsystem may utilize neural machine translation models, including encoder-decoder architectures, attention mechanisms, and transformer models, to generate high-quality translations. In one example embodiment, the post-processing subsystem may be configured to convert the translated text into a format suitable for multimedia output. For example, the post-processing subsystem may generate synthesized speech using text-to-speech algorithms, create video subtitles or dubbing, or produce translated text for display alongside multimedia content according to various user specifications.

In another example embodiment, the processor 102 may incorporate additional subsystems for handling specific multimedia translation tasks, such as image-to-text translation, sign language recognition, and translation, translating visual cues and gestures in video content, and/or the like. These additional subsystems may be integrated with the processor 102 to provide a comprehensive solution for multimedia translation across different languages.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation-and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
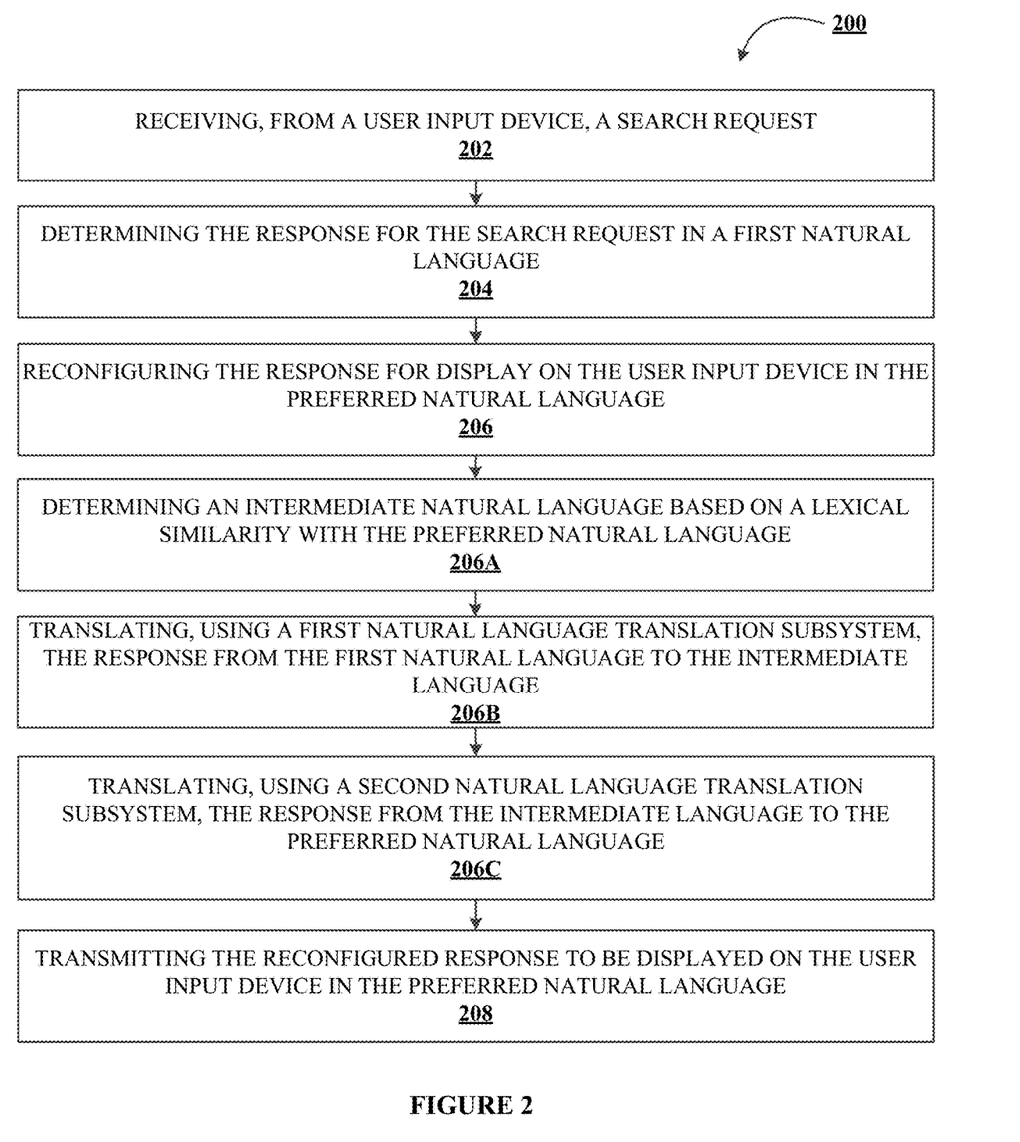
FIG. 2 illustrates a process flow for automated translation of digital multimedia, in accordance with an embodiment of the disclosure.

FIG. 2 illustrates a process flow for automated translation of digital multimedia 200, in accordance with an embodiment of the disclosure. As shown in block 202, the process flow includes receiving, from a user input device, a search request. In some embodiments, wherein the search request may include a search query. In one aspect, a search query may be a request made by a user to find information related to a particular topic or keyword. A search query may include a set of words, phrases, audio, video, images, and/or the like, that a user may enter into an input field to initiate a search. A search query may be simple or complex, and may include specific phrases, questions, or other criteria to help the user find the information they are looking for.

In some embodiments, the search request may include a preferred natural language for a response to the search query. In one aspect, the preferred natural language may be identified automatically based on the natural language associated with the search query. For example, if the search query is in English, the system may determine that the preferred natural language for the response to the search query is English. In another aspect, the preferred natural language may be different from the natural language associated with the search query. In this regard, the user may, in addition to entering the search query, may also input the preferred natural language for the response to the search query. For example, the search query may be in English, while the preferred natural language for the response to the search query may be in Nepalese.

As shown in block 204, the process flow includes determining the response for the search query in a first natural language. In some embodiments, in response to receiving the search query, the system may use the search query to search one or more sources of information (e.g., an index of associated web pages and other online content) to provide a list of relevant results that match the search query. In some embodiments, the system may initially search for the response in the preferred natural language. In some cases, the system may determine that the response for the search query is unavailable in the preferred natural language, and in response, identify relevant results that in other natural languages. To this end, the system may translate the search query, using machine translation algorithms (e.g., rule-based translation, statistical machine translation, neural machine translation, example-based translation, and/or the like), from an input natural language (e.g., preferred natural language) into multiple natural languages to expand the scope of relevant results for the user. Based on the relevant list of results obtained, the system may determine the response as the most relevant result from the list of results. As such, the response may be in a first natural language that is different from the input natural language and/or the preferred natural language.

In some embodiments, the response may include digital multimedia. Digital multimedia may refer to the integration of various forms of media such as text, images, audio, video, and animation into digital content that can be accessed and viewed through electronic devices such as user input device. As such, digital multimedia may take many forms, including digital images, digital audio, digital video, interactive multimedia presentations, and other forms of digital content. Digital multimedia may also be interactive, allowing users to interact with the content through buttons, menus, and other interactive elements.

As shown in block 206, the process flow includes reconfiguring the response for display on the user input device in the preferred natural language. In some embodiments, reconfiguring the response may include converting the response from the first natural language (e.g., the language in which the response was initially retrieved) to the preferred natural language. To this end, the system may determine applicable natural language translation subsystems that are capable of translating the response from the first natural language to the preferred natural language.

In one example embodiment, natural language translation subsystems may employ a neural machine translation (NMT) model to translate the response into the preferred natural language using the syntactic and semantic representation thereof. Here, the syntactic and semantic representation of the response may include information such as part-of-speech tags, parse trees, dependency graphs, named entities, and other linguistic features that help convey the meaning and structure of the response. The NMT model may be based on various architectures, such as recurrent neural networks (RNNs), convolutional neural networks (CNNs), transformer models, and/or the like. The NMT model may include an encoder that processes the input representation, a decoder that generates the preferred natural language text, and an attention mechanism that helps the model focus on relevant parts of the input while translating.

In other example embodiments, the natural language translation subsystem may incorporate additional features or techniques to improve translation quality. For example, the natural language translation subsystem may use transfer learning to leverage pre-trained models and adapt them to specific translation tasks or domains. The natural language translation subsystem may also employ techniques such as beam search, sequence-to-sequence learning, or reinforcement learning to optimize the translation process.

In some embodiments, each natural language translation subsystem may be configured to translate input content from a source natural language (e.g., first natural language) to a target natural language (e.g., preferred natural language). In some other embodiments, the natural language translation subsystem may be designed to translate input content from one source language to multiple target languages simultaneously, using techniques such as multilingual NMT models, zero-shot translation, or pivot-based translation. This capability allows the natural language translation subsystem to translate the input content into several languages (e.g., several intermediate natural languages) without the need for separate models for each language pair.

In some other embodiments, reconfiguring the response may further include re-formatting the response based on user specification provided with the search request. To this end, the system may use a post-processing subsystem to convert the translated text into a format suitable for multimedia output, including text, audio, video presentations, and/or the like according to the user specification.

In one aspect, the user specification may include information associated with how the user wishes to receive the response. For example, the user specification may include a preferred medium of consumption. In one example, the medium of consumption may be text based. Here, regardless of the format in which the response was initially identified, the user specification may request that the resulting response be in textual format. In such cases, even if the response is initially in digital multimedia format (e.g., audio-visual format), the system, in reconfiguring the response, may not only convert the response from the first natural language to the preferred natural language, but also transcribe the response to a textual format. In another example, the medium of consumption may be audio-visual based. Here, if the response is initially in a textual format in the first natural language, the system, in reconfiguring the response, may not only convert the response from the first natural language to the preferred natural language, but also generate an avatar to deliver the response to the user in an audio-visual medium.

In one example embodiment, the post-processing subsystem may be configured to process the translated response to generate multimedia output in various formats, such as synthesized speech, video subtitles or dubbing, translated text for display alongside multimedia content, and/or the like according to the user specification. The synthesized speech output can be generated using text-to-speech (TTS) algorithms, which convert the translated text into audible speech. The TTS algorithms may employ various techniques, such as concatenative synthesis, formant synthesis, or parametric synthesis, to produce natural-sounding speech in the target language. For video subtitles or dubbing, the post-processing subsystem may use time codes, visual cues, or audio features extracted from the original multimedia content to synchronize the translated text with the corresponding video or audio segments. This process ensures that the subtitles or dubbed audio aligns accurately with the original content.

In another example embodiment, the post-processing subsystem may incorporate additional features or techniques to enhance the output quality of the response. For example, the subsystem may use machine learning algorithms to generate voice intonation, emotion, or style for synthesized speech output, making it more expressive and engaging. Additionally, the post-processing subsystem may apply automated formatting or styling to the translated text for display, ensuring readability and consistency across different devices and platforms.

In some other embodiments, reconfiguring the response may include re-structuring the response based on the specificity of applicability of the response to the search query, and/or the like. For example, if only a portion of the response is applicable to the search query, the system may re-structure the response to reflect only the most applicable portion. In other words, only the applicable portion is converted to the preferred natural language and/or re-formatted to meet the user specification.

As shown in block 206A, the process flow includes determining an intermediate natural language based on a lexical similarity with the preferred natural language. In some embodiments, the system may not be able to identify a natural language translation subsystem that is capable of directly translating the response from the first natural language to the preferred language. In such cases, the system may identify an intermediate natural language based on its lexical similarity with the preferred natural language. In addition to identifying the intermediate natural language, the system may also determine requisite natural language translation subsystems to translate the response from the first natural language to the intermediate natural language, and subsequently translate the response from the intermediate natural language to the preferred natural language. If the requisite natural language translation subsystems are unavailable, the system may then choose an intermediate natural language that has the requisite natural language translation subsystems associated therewith.

In some embodiments, the system may identify a sequence of intermediate natural languages based on one or more factors, such as their lexical similarity with one another, their lexical similarity with the preferred natural language, user feedback from historical translation data, and/or the like. In one example embodiment, the system may determine that intermediate natural language IL_1 has a lexical similarity of 0.5 with the preferred natural language. However, the system may also determine that IL_1 has a lexical similarity of 0.8 with intermediate natural language IL_2 and IL_2 has a lexical similarity of 0.7 with the preferred natural language. In such cases, the system may concatenate the translation process by translating the response from the first natural language to IL_1, and then translate the response from IL_1 to IL_2, and finally translating the response from IL_2 to the preferred natural language. Said differently, the system may optimize the selection of intermediate language(s) to maximize the overall lexical similarity between the first natural language and the preferred natural language, thus improving the overall accuracy of the translation. In addition to identifying the intermediate natural languages, the system may also determine requisite natural language translation subsystems to translate the response from the first natural language to the intermediate natural languages, translate the response between the intermediate natural languages (IL_1→ IL 2→ . . . →IL_n) and subsequently translate the response from the intermediate natural language (IL_n) to the preferred natural language.

As shown in block 206B, the process flow includes translating, using a first natural language translation subsystem, the response from the first natural language to the intermediate language. As shown in block 206C, the process flow includes translating, using a second natural language translation subsystem, the response from the intermediate language to the preferred natural language.

In some embodiments, the system may determine that the response may include both audio and video media components. In response, the system may translate, using the first natural language translation subsystem, the audio media component from the first natural language to the intermediate natural language. In addition, the system may also generate, using the first natural language translation subsystem, a transcript of the audio media component in the intermediate natural language. Then, the system may translate, using the second natural language translation subsystem, the audio media component from the intermediate natural language to the preferred natural language. In addition, the system may generate, using the second natural language translation subsystem, a transcript of the audio media component in the preferred natural language. In response, the system may overlay the audio media component in the preferred natural language on the video media component. In doing so, the system may mute the audio media component in the first natural language.

As shown in block 208, the process flow includes transmitting the reconfigured response to be displayed on the user input device in the preferred natural language. In some embodiments, the system may also transmit the transcript of the audio media component in the preferred natural language to be displayed on the user input device.

Figure 3:
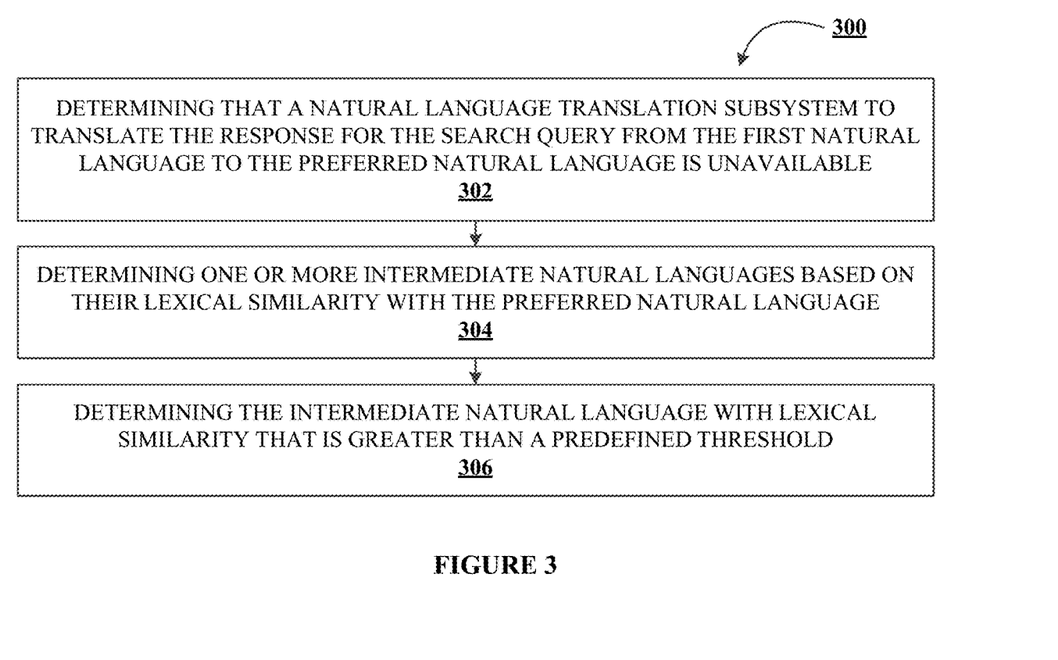
FIG. 3 illustrates a process flow for identifying an intermediate natural language, in accordance with an embodiment of the disclosure.

FIG. 3 illustrates a process flow for identifying an intermediate natural language 300, in accordance with an embodiment of the disclosure. As shown in block 302, the process flow includes determining that a natural language translation subsystem to translate the response for the search query from the first natural language to the preferred natural language is unavailable. Typically, to reconfigure the response, the system may translate, using a natural language translation subsystem, the response from the first natural language to a preferred natural language. However, in some cases, there may not be a natural language translation subsystem that is capable of translating the response from the first natural language to the preferred natural language. In such cases, the system may determine one or more intermediate natural languages based on their lexical similarity with the preferred natural language.

As shown in block 304, the process flow includes determining one or more intermediate natural languages based on their lexical similarity with the preferred natural language. In some embodiments, lexical similarity may refer to a degree of similarity or overlap between two natural languages, particularly in terms of their vocabularies. It may be used to measure the extent to which two natural languages share similar words or cognates, which are words that have a common origin and similar meanings in different natural languages. Lexical similarity may be measured in different ways, such as using statistical measures (e.g., Levenshtein distance, cosine similarity, and/or the like) or through manual analysis of natural language data, percentage of shared lexical items between two natural languages, and/or the like. In some embodiments, in addition to lexical similarity, grammatical structure, phonetics and phonology, syntax, vocabulary, cultural context, and/or the like may be used to identify intermediate natural languages that are similar to the first natural language. In some embodiments, the system may determine one or more natural language translation subsystems associated with the one or more intermediate natural languages that are capable of translating the response for the search query from the first natural language to the one or more intermediate natural languages, and from the one or more intermediate natural languages to the preferred natural language. If a natural language translation subsystem for a particular intermediate natural language is unavailable, that intermediate natural language is excluded from consideration.

As shown in block 306, the process flow includes determining the intermediate natural language with lexical similarity that is greater than a predefined threshold. In some embodiments, lexical similarity may be represented in many ways, including network graphs, heat maps, distance measures (e.g., cosine similarity), word embeddings, and/or the like. Depending on the type of measurement, the system may establish a threshold based on the lexical similarity to identify at least one intermediate natural language that is close in lexical similarity with the first natural language. Any intermediate natural languages that meet or exceed this threshold are considered for translation.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A natural language generation system for automated translation of digital multimedia, the system comprising:
   a processing device;
   a non-transitory storage device containing instructions when executed by the processing device, causes the processing device to perform the steps of:
      receive, from a user input device, a search request, wherein the search request comprises a search query and a preferred natural language for a response to the search query;
      determine the response for the search query in a first natural language, wherein the response comprises digital multimedia;
      reconfigure the response for display on the user input device in the preferred natural language, wherein reconfiguring further comprises:
         determining an intermediate natural language based on a lexical similarity with the preferred natural language;
         translating, using a first natural language translation subsystem, the response from the first natural language to the intermediate language;
         determining that only a portion of the response is applicable to the search query; and
         translating, using a second natural language translation subsystem, the portion of the response from the intermediate language to the preferred natural language while retaining a remaining portion of the response in the intermediate language; and transmit the reconfigured response to be displayed on the user input device, wherein the portion of the reconfigured response is displayed in the preferred natural language.

2. The system of claim 1, wherein executing the instructions further causes the processing device to:
  determine that the response for the search query is unavailable in the preferred natural language; and
  in response, determine the response for the search query in the first natural language.

3. The system of claim 1, wherein executing the instructions to reconfigure the response further causes the processing device to:
  determine that the response comprises audio and video media components;
  translate, using the first natural language translation subsystem, the audio media component from the first natural language to the intermediate natural language; and
  generate, using the first natural language translation subsystem, a transcript of the audio media component in the intermediate natural language.

4. The system of claim 3, wherein executing the instructions further causes the processing device to:
  translate, using the second natural language translation subsystem, the audio media component from the intermediate natural language to the preferred natural language;
  generate, using the second natural language translation subsystem, a transcript of the audio media component in the preferred natural language; and
  overlay the audio media component in the preferred natural language on the video media component, wherein overlay further comprises muting the audio media component in the first natural language.

5. The system of claim 4, wherein executing the instructions further causes the processing device to:
  transmit the transcript of the audio media component in the preferred natural language to be displayed on the user input device.

6. The system of claim 1, wherein executing the instructions further causes the processing device to:
  determine that a natural language translation subsystem to translate the response for the search query from the first natural language to the preferred natural language is unavailable;
  determine one or more intermediate natural languages based on their lexical similarity with the preferred natural language; and
  determine the intermediate natural language with lexical similarity that is greater than a predefined threshold.

7. The system of claim 6, wherein executing the instructions further causes the processing device to:
  determine one or more natural language translation subsystems associated with the one or more intermediate natural languages that are capable of translating the response for the search query from the one or more intermediate natural languages to the preferred natural language.

8. A computer program product for automated translation of digital multimedia, the computer program product comprising a non-transitory computer-readable medium comprising code causing an apparatus to:
  receive, from a user input device, a search request, wherein the search request comprises a search query and a preferred natural language for a response to the search query;
  determine the response for the search query in a first natural language, wherein the response comprises digital multimedia;
  reconfigure the response for display on the user input device in the preferred natural language, wherein reconfiguring further comprises:
    determining an intermediate natural language based on a lexical similarity with the preferred natural language;
    translating, using a first natural language translation subsystem, the response from the first natural language to the intermediate language;
    determining that only a portion of the response is applicable to the search query; and
    translating, using a second natural language translation subsystem, the portion of the response from the intermediate language to the preferred natural language while retaining a remaining portion of the response in the intermediate language; and
  transmit the reconfigured response to be displayed on the user input device, wherein the portion of the reconfigured response is displayed in the preferred natural language.

9. The computer program product of claim 8, wherein the code further causes the apparatus to:
  determine that the response for the search query is unavailable in the preferred natural language; and
  in response, determine the response for the search query in the first natural language.

10. The computer program product of claim 8, wherein, in reconfiguring the response, the code further causes the apparatus to:
  determine that the response comprises audio and video media components;
  translate, using the first natural language translation subsystem, the audio media component from the first natural language to the intermediate natural language; and
  generate, using the first natural language translation subsystem, a transcript of the audio media component in the intermediate natural language.

11. The computer program product of claim 10, wherein the code further causes the apparatus to:
  translate, using the second natural language translation subsystem, the audio media component from the intermediate natural language to the preferred natural language;
  generate, using the second natural language translation subsystem, a transcript of the audio media component in the preferred natural language; and
  overlay the audio media component in the preferred natural language on the video media component, wherein overlay further comprises muting the audio media component in the first natural language.

12. The computer program product of claim 11, wherein the code further causes the apparatus to:
  transmit the transcript of the audio media component in the preferred natural language to be displayed on the user input device.

13. The computer program product of claim 8, wherein the code further causes the apparatus to:
  determine that a natural language translation subsystem to translate the response for the search query from the first natural language to the preferred natural language is unavailable;

determine one or more intermediate natural languages based on their lexical similarity with the preferred natural language; and determine the intermediate natural language with lexical similarity that is greater than a predefined threshold.

14. The computer program product of claim 13, wherein the code further causes the apparatus to:

determine one or more natural language translation subsystems associated with the one or more intermediate natural languages that are capable of translating the response for the search query from the one or more intermediate natural languages to the preferred natural language.

15. A method for automated translation of digital multimedia, the method comprising:

receiving, from a user input device, a search request, wherein the search request comprises a search query and a preferred natural language for a response to the search query;

determining the response for the search query in a first natural language, wherein the response comprises digital multimedia;

reconfiguring the response for display on the user input device in the preferred natural language, wherein reconfiguring further comprises:

determining an intermediate natural language based on a lexical similarity with the preferred natural language;

translating, using a first natural language translation subsystem, the response from the first natural language to the intermediate language;

determining that only a portion of the response is applicable to the search query; and translating, using a second natural language translation subsystem, the portion of the response from the intermediate language to the preferred natural language while retaining a remaining portion of the response in the intermediate language; and transmitting the reconfigured response to be displayed on the user input device, wherein the portion of the reconfigured response is displayed in the preferred natural language.

16. The method of claim 15, wherein the method further comprises:

determining that the response for the search query is unavailable in the preferred natural language; and in response, determining the response for the search query in the first natural language.

17. The method of claim 15, wherein the method further comprises:

determining that the response comprises audio and video media components;

translating, using the first natural language translation subsystem, the audio media component from the first natural language to the intermediate natural language; and generating, using the first natural language translation subsystem, a transcript of the audio media component in the intermediate natural language.

18. The method of claim 17, wherein the method further comprises:

translating, using the second natural language translation subsystem, the audio media component from the intermediate natural language to the preferred natural language;

generating, using the second natural language translation subsystem, a transcript of the audio media component in the preferred natural language; and overlaying the audio media component in the preferred natural language on the video media component, wherein overlay further comprises muting the audio media component in the first natural language.

19. The method of claim 18, wherein the method further comprises:

transmitting the transcript of the audio media component in the preferred natural language to be displayed on the user input device.

20. The method of claim 15, wherein the method further comprises:

determining that a natural language translation subsystem to translate the response for the search query from the first natural language to the preferred natural language is unavailable;

determining one or more intermediate natural languages based on their lexical similarity with the preferred natural language; and determining the intermediate natural language with lexical similarity that is greater than a predefined threshold.

* * * * *